United States Patent Office

3,838,188
Patented Sept. 24, 1974

3,838,188
VACUUM BAKED COMPOSITE MOLDED
CARBONACEOUS ELECTRODES
William F. Farrell, Jr., Williamsville, N.Y., assignor to
The Carborundum Company, Niagara Falls, N.Y.
No Drawing. Filed June 29, 1972, Ser. No. 267,274
Int. Cl. C01b 31/00
U.S. Cl. 264—29                                    12 Claims

ABSTRACT OF THE DISCLOSURE

Composite molded carbonaceous EDM electrodes consisting essentially of 60–100 parts of at least partially graphitized carbon particles, up to 40 parts ungraphitized carbon particles, and 5–25 parts carbonized cured phenol-aldehyde novolac resin matrix bonding together the graphitized and ungraphitized carbon particles, are made by (1) coating the particles with a phenol-aldehyde novolac resin; (2) molding the coated particles into a resin-bonded composite body; and (3) baking the resin-bonded composite body to carbonize the bonding matrix, in an oxygen-free environment which has been flushed to remove traces of oxygen. The finished electrodes are, as compared to similar EDM electrodes baked in a nitrogen atmosphere, surprisingly superior in their performance during machining, as particularly characterized by a lack of localized arcing during machining. The electrodes are also characterized by their apparent freedom from surface oxidation; their surface hardness; and unchanged or increased average surface hardness during baking, rather than the decreased average surface hardness during baking which is characteristic of minute surface oxidation of the electrodes.

CROSS-REFERENCE TO RELATED APPLICATIONS

This is an improvement upon the invention of copending, commonly assigned, U.S. patent application Ser. No. 243,240, filed Apr. 12, 1972, by L. D. Loch, the disclosure of which is incorporated by reference. Ser. No. 243,-240 is a continuation-in-part of commonly assigned U.S. patent application Ser. No. 22,767, filed Mar. 26, 1970, and now abandoned.

BACKGROUND OF THE INVENTION

This invention relates to composite molded carbonaceous electrodes. More particularly it relates to composite molded carbonaceous electrical discharge machining (EDM) electrodes, which can be molded into complex shapes and fabricated quickly and inexpensively.

Electrical discharge machining (sometimes called spark machining, electro-erosion machining or arc machining), is a process of machining away a portion of an electrically conductive workpiece (usually metal) by passing a series of electrical discharges across a gap between an electrically conductive EDM electrode and the workpiece. Usually a dielectric fluid is used between the electrode and the workpiece, and a series of parts of a predetermined frequency and amperage is passed either from the electrode to the workpiece or vice versa. The sparks travel the shortest distance between the electrode to the workpiece, and in so doing machine away a portion of the workpiece. The next spark travels a different path, because the previous path has been lengthened. By discharging a large number of sparks, the shape of the electrode (in reverse) is machined into the workpiece. Meanwhile a dielectric fluid is circulated through the work area, simultaneously transmitting sparks from the electrode to the workpiece (or vice versa), flushing away machined metal particles, and cooling the work area. Variations on the above procedure are known. One application of EDM which is the manufacture of dies for forging operations. An electrode having the same shape as the ultimately desired part is used to machine this shape into the die to be used to forge the desired part.

Materials which have been used for such electrodes in the past have included metals and alloys (such as copper, brass or zinc-tin alloy) and machined graphite. Metal electrodes are themselves eroded during machining, to a greater extent than graphite; and the raw materials for metal electrodes that are also relatively expensive. Electrodes machined from black graphite solve these problems but require individual machining, and thus raise the cost of the electrodes in another way. They are also difficult to duplicate exactly. Pure graphite molded electrodes require lengthy graphitization at high temperatures (on the order of 2600° C.). Substitutes for pure molded graphite also have in the past required substantial lengthy processing of one type or another, such as lengthy and potentially dangerous compositions of pyrolytic carbon, for example by thermal decomposition of benzene. Processes which include extrusion of limited value because they can be used only when the electrode is to have a uniform cross-sectional shape. Furthermore, processes which include heating by internal resistance (i.e., passing an electrical current through the electrode to generate the heat necessary to cure or bake the mixtures used to make the electrode) are not useful for complex shapes, since the irregular shape causes irregular current distribution, and results in nonuniform electrodes.

According to copending, commonly assigned, U.S. patent application Ser. No. 243,240, filed Apr. 12, 1972 by L. D. Loch, there is provided an electrode which overcomes many of these disadvantages, this electrode consisting essentially of (1) carbon inclusions, preferably having a particle size smaller than about 297 microns, each 100 parts of inclusions consisting of from about 60 to 100 parts of graphite inclusion and from 0 to about 40 parts of petroleum coke inclusions; and (2) from about 5 to about 25 parts, per 100 parts of graphite and petroleum coke inclusions, of a carbonized cured phenol-aldehyde novolac resin matrix binding together the graphite and petroleum coke inclusions. The electrodes made according to the invention of application Ser. No. 243,240, however, have been found under some conditions to "arc out," i.e., to arc in a single location, rather than in successively different places, so that the proper machining operation is interrupted, requiring the replacement of the electrode. This sometimes occurring failure of the electrodes of application Ser. No. 243,240 is believed to be due to minute surface oxidation during baking (carbonization of the resin binder), of which a decrease in average surface hardness during baking is characteristic. It is, therefore, an object of this invention to provide a composite molded carbonaceous EDM electrode, which has the advantages of the invention of application Ser. No. 243,240, and which is also characterized by more consistent satisfactory performance during electrical discharge machining, apparent freedom from minute surface oxidation as characterized by an unchanged or increased average surface hardness during baking, and increased surface hardness of the electrode.

SUMMARY OF THE INVENTION

These and other objects are attained, according to the present invention, by (1) forming a dry powder, each 100 parts of powder comprising from about 60–100 parts of at least partially graphitized powder, and from 0 to about 40 parts of ungraphitized petroleum coke powder; (2) coating the dry powder with from about 10 to about 35 parts, per 100 parts of dry powder, of a phenol-aldehyde novolac resin coating, whereby to form a coated powder; (3) molding a predetermined amount of the coated powder into a resin-bonded composite body at a temperature of from about 100° C. to about 600° C. for a period of from about 30 seconds to about 5 hours to obtain a density of from about 1.3 to about 1.8 grams per cubic centimeter; (4) placing the resin-bonded composite body in a sealable, evacuable baking furnace which is free from oxygen-yielding impurities; (5) sealing the baking furnace to prevent the entry of oxygen; (6) evacuating the baking furnace by pumping the gaseous content therefrom, until an absolute pressure of less than about 0.5 mm. Hg, preferably less than about 0.1 mm. Hg, is attained; (7) flushing the baking furnace at least once, preferably at least twice, during evacuation by introducing a quantity of low molecular weight gas selected from the group consisting of hydrogen, helium, neon, argon, and krypton, preferably helium, into the baking furnace while continuing to pump the gaseous content from the baking furnace, and maintaining a subatmospheric pressure within the baking furnace; (8) raising the temperature of the baking furnace to at least about 1250° C. suitably at a rate of temperature increase of not greater than 50° C./hour, maintaining the absolute pressure within the baking furnace at less than about 1.00 mm. Hg, preferably less than about 0.5 mm. Hg, during this temperature raising step; (9) baking the resin-bonded composite body in the baking furnace at a temperature of at least about 1250° C. for at least about 30 minutes, preferably at least about 1300° C. for at least about 1 hour, while maintaining the vacuum at less than about 5.0 mm. Hg, preferably less than about 0.5 mm. Hg, whereby to completely cure the resin within the composite body and to carbonize the cured resin, converting said resin to a carbon matrix bonding together the at least partially graphitized carbon and ungraphitized petroleum coke as inclusions and forming a composite molded carbonaceous electrode; (10) discontinuing pumping and heating; (11) allowing the temperature of the baking furnace to drop to less than about 200° C. prior to breaking the seal on the baking furnace; and (12) removing the composite molded carbonaceous electrode.

Other preferred features of the present invention are set forth in the detailed description which follows.

DETAILED DESCRIPTION

The preferred process for coating the dry powder for use in the process of this invention comprises dissolving the phenol-aldehyde novolac resin (including curing agent) in a suitable volatile solvent to form a resin solution; forming a suspension of the graphite and petroleum coke powder in the resin solution; and introducing the suspension into a spray-drying apparatus through which is passed a stream of drying gas having an entrance temperature substantially above the boiling point of the solvent, whereby the solvent evaporates to leave resin-coated powder.

Unless indicated otherwise, all parts herein are stated by weight. The term "resin-bonded composite body" is generic to (1) a body which contains fully cured but uncarbonized resin, (2) a body in which the resin is only partially cured, and (3) a body in which the resin is partially carbonized. Pressures, unless indicated as absolute pressures, are indicated as the pressure above the prevailing atmospheric pressure, i.e., "gauge" pressures. Particle sizes are indicated as the opening in sieves through which the particles would pass.

The raw materials used for the composite molded carbonaceous EDM electrodes of the present invention include at least partially graphitized carbon particles, phenol-aldehyde novolac resin, a suitable volatile solvent for the resin, and optionally ungraphitized petroleum coke powder. For convenience herein, the term "graphite" is used herein to indicate the at least partially graphitized carbon particles, and the phrase "petroleum coke" to indicate the ungraphitized petroleum coke. The "at least partially graphitized carbon" particles are more accurately denominated as such rather than "graphite," since the interlaminar spacing of the carbon atoms of these particles, individual particle hardness, electrical conductivity, and the like, may be intermediate between the properties of completely amorphous ("glassy") and completely graphitized carbon form such as natural graphite. In spite of their incomplete graphitization, these particles are commonly known in the art as "graphite" and that nomenclature is adopted here.

The graphite and petroleum coke powders should preferably be smaller than about 297 microns (50 mesh, U.S. Standard Sieve), preferably at least about 98% smaller than 74 microns (200 mesh), and less than about 0.5% larger than 147 microns (100 mesh). The petroleum coke is preferably "needle coke," i.e., coke derived from petroleum residues which have been cleaned of insoluble or suspended matter. Needle coke is characterized by its oblong needle-like shape; details of its production are given, for example, in U.S. Pat. 2,775,549. The coke used for the present invention, whether needle coke or not, is preferably calcined at a temperature on the order of about 1000–1500° C. to reduce the volatile content of the coke to less than about 1%. For convenience, the term "carbon powder" is used to describe all of the above powders, including the at least partially graphitized carbon ("graphite").

The resin for use in the present invention is a phenol-aldehyde (phenolic) novolac resin, i.e., the condensation product of aldehydes and phenols, with a slight excess of the phenol component and including a suitable curing agent. Such resins can be made by condensing formaldehyde and excess phenol, e.g., about 0.8 to about 0.9 moles of formaldehyde per mole of phenol. A suitable amount of curing agent, e.g., about 5 to about 10% hexamethylenetetramine by weight of the resin, is included with the phenol - formaldehyde condensation product. Novolac resins including such curing agents are readily available, for example, in powdered form, and it is preferred to use a powdered novolac resin.

Solvents for use in the present invention are vehicles for coating the carbon powder with resin. Their use is not essential, but highly preferred. It is desirable that the solvent be volatile, so that it can easily be evaporated. Preferred solvents including alcohols having from 1 to about 3 carbon atoms, e.g., methyl, ethyl, propyl and isopropyl alcohols. Ethyl alcohol, as used herein, includes denatured alcohol, and is preferred for its high solvent action, high volatility, and low cost. A nonflammable diluent such as methylene chloride can be used if desired.

The preferred process for producing composite molded carbonaceous bodies of the present invention, comprises three major operations, namely forming a resin-coated powder (steps 1 and 2), molding the resin-coated powder under mechanical pressure and temperature to form a resin-bonded composite body (step 3), and baking the resin-bonded composite body in an environment which has been evacuated and flushed of oxygen impurities, and is maintained under an absolute pressure of less than about 5.0 mm. Hg, to remove any remaining volatile matter and yield the finished composite electrode (steps 4–12).

The phenol-aldehyde novolac resin is dissolved in the solvent (if used) to form a resin solution. Preferably sufficient solvent is used to form a stirrable suspension when the other ingredients are added, e.g., at least about 75 parts of solvent per 100 parts of resin plus dry carbon powder.

Petroleum coke (preferably from about 10 to about 40 parts, and particularly about 15 parts, per 100 parts of carbon powder) is optionally included. Its chief benefit is the reduction in the amount of shrinkage which occurs when the composite body is baked. If used, the coke is preferably mixed with the graphite to form a dry powder before adding the resin.

The dry powder is preferably combined with the resin solution to form a suspension of the powder in the resin solution. This suspension need not be stable, but can be maintained by appropriate mixing action. According to this preferred feature of the present invention, the suspension is introduced into a spray-drying apparatus through which is passed a stream of drying gas having an entrance temperature substantially (e.g., at least about 30° C.) above the boiling point of the solvent used. This causes the solvent to evaporate, leaving resin-coated powder. Spray-drying apparatus of this type is well-known, being described for example in Perry's *Chemical Engineer's Handbook,* pages 20–57 and following (McGraw-Hill Book Company, 4th Ed., 1963).

The proportions of resin solution and dry powder should be such as to leave a coating of from about 10 to about 35 parts resin per 100 parts of carbon particles. For a resin which yields 50–75% carbon when carbonized, such as is typical with a phenol-novolac resin, this produces a finished body comprising a carbon matrix of from about 5 to about 25 parts of matrix per 100 parts of inclusions. The preferred 15 parts of novolac resin yields roughly 10 parts of matrix per 100 parts of inclusions on carbonization. Other permissible variations are set forth in application Ser. No. 243,240.

The raw batch (resin-coated powder) is next molded into an unbaked resin-bonded composite body, as described in application Ser. No. 243,240. Densities can be as low as 1.3 grams per cubic centimeter, if desired, but should not exceed 1.8 g./cm.$^3$. Usually this will require a molding pressure of from about 20 to about 600 kg./cm.$^2$. For some shapes of electrodes, it is convenient to pre-mold the powder to approximate shape prior to the molding operation.

The resin-bonded body is next baked to carbonize the resin (i.e., to remove the remaining volatile matter), yielding a finished backed composite EDM electrode. It is in this baking step that the present invention differs chiefly from that of Ser. No. 243,240, of which the present invention is an improvement. As with the invention of Ser. No. 243,240, the baking temperature of at least about 1250° C. should be maintained for at least about 30 minutes. A baking temperature of 1300° C., maintained for at least about 1 hour, is preferred. In the invention of Ser. No. 243,240, the composite body was preferably surrounded during baking with fine graphite, sand, coke, carbon black, or mixtures of such materials, to prevent oxidation; but this feature is unimportant in the practice of the present invention. In the invention of Ser. No. 243,240, a non-oxidizing atmosphere, conveniently nitrogen, was used in the baking furnace to prevent oxidation. In the present invention, however, it has been found that substantially and unexpectedly harder electrodes, which are superior in use to those of the invention of Ser. No. 243,240, are obtained if the nonoxidizing atmosphere is removed, and the electrodes are baked instead under a vacuum environment, i.e., with an absolute pressure of less than about 0.5 mm. Hg. The furnace should also be free from oxygen-yielding impurities such as silica or water from previous uses of the furnace. Furthermore, it has been found that under these conditions electrodes are improved if the baking furnace is flushed at least once during evacuation by introducing a quantity of low molecular weight gas selected from the group consisting of hydrogen, helium, neon, argon and krypton into the baking furnace, while evacuating the baking furnace by pumping the gaseous content therefrom. The function of the low molecular weight gas is to enter the pores of the composite bodies which are to be baked into electrodes, and force out the minute traces of oxygen which linger in the pores of the composite body, so that the electrode can be baked in an essentially oxygen-free environment. While a number of gases as enumerated above can be used, helium is preferred because of its lower molecular weight and consequent greater penetrating ability, as well as its low cost. Hydrogen, while of lower molecular weight than helium, is diatomic and also combustible and potentially explosive, even though no heating occurs while the flushing operation is carried out.

With the electrodes placed in the baking furnace, the baking furnace is sealed to prevent the entry of oxygen, and the gaseous content is pumped from the furnace, until an absolute pressure of less than about 0.5 mm. Hg, preferably less than about 0.1 mm. Hg, is attained. During this evacuation, preferably after the preferred 0.1 mm. Hg has been reached a first time, the baking furnace is flushed by introducing a quantity of low molecular weight gas into it. It is important that when this flushing gas is introduced into the baking furnace, a subatmospheric pressure be maintained within the baking furnace, so that the seal between the air portion of the baking furnace and the outside atmosphere will not be broken. In particular, it is preferred that the ratio of the volume of the low molecular weight gas, at the prevailing atmospheric pressure and prevailing temperature, to the unoccupied volume of the baking furnace, range from about 1:4 to about 1:2; i.e., that the baking furnace be filled about 25–50% with low molecular weight gas. It is also preferred that at least 2 flushing steps be carried out during evacuation, in order to better remove lingering traces of oxygen from the pores of the resin-bonded composite bodies which are to be baked into electrodes.

After the flushing operations are completed and the desired 0.5 or 0.1 mm. Hg absolute pressure is attained, the actual baking of the electrodes is accomplished in the baking furnace. The baking operation is accomplished by raising the temperature of the baking furnace to at least about 1250° C. and maintaining this temperature for at least 30 minutes. The rate of temperature increase should be limited to not greater than about 50° C./hour, and the absolute pressure within the baking furnace should be maintained at less than about 1.0 mm. Hg during the temperature raising step. During the baking operation, various volatile materials from the composite molded carbonaceous body are given off as the baking furnace is brought to higher and higher temperatures. If the temperature of the baking furnace is raised too rapidly, the absolute pressure within the baking furnace will increase above the desired 1.0 mm. Hg level, and the evacuation system will not have sufficient time to remove the volatile materials from the vicinity of the resin-bonded composite bodies which are being baked into electrodes, so that the decomposition products from the carbonization of the resin will be available to act upon the surface of the resin-bonded composite body as it is being baked and destroy its hardness.

After the baking temperature of at least about 1250° C. (preferably at least about 1300° C.) is attained, this temperature is maintained for at least about 30 minutes (preferably at least about 1 hour) while maintaining the vacuum at less than about 5.0 mm. Hg (preferably less than about 0.5 mm. Hg). This baking completely cures the resin within the composite body, and carbonizes the cured resin, converting the resin to a carbon matrix which bonds together the carbon powder as inclusions, and forms a composite molded carbonaceous electrode from the composite molded carbonaceous body. Then the pumping and heating of the furnace are discontinued, and the temperature of the baking furnace is allowed to drop to less than about 200° C. prior to breaking the seal on the baking furnace so that the composite molded carbonaceous electrodes can be removed. Since the baking furnace has been evacuated, however, the temperature transmission between the hot baked electrodes and the cooler prevailing atmosphere outside the baking furnace has been disrupted, due to the insulating properties of the vacuum. It is therefore preferred that a quantity of inert gas be introduced into the baking furnace after discontinuing pumping and heating, so that the cooling of the baked electrodes and furnace may be accomplished more rapidly. This quantity should have a volume, at the prevailing atmospheric pressure and the temperature of baking, which is less than the unoccupied volume of the baking furnace, so that the seal on the baking furnace is not broken. As the temperature drops, the observed pressure within the baking furnace becomes less, because of the contraction of gases with decreasing temperature. It is therefore desirable at a predetermined temperature level within the cooling cycle, to introduce a second quantity of inert gas into the baking furnace after the temperature of the baking furnace has reached this predetermined temperature level. In particular, it has been found desirable that the ratio of the volume, at the prevailing atmospheric pressure and the temperature of baking, of the first quantity of inert gas, introduced into the baking furnace after discontinuing pumping and heating, to the unoccupied volume of the baking furnace, range between about 1:4 to about 1:2. The second quantity of inert gas should be introduced into the baking furnace after the temperature of baking has dropped below about 900° C. The sum of the volumes, at the prevailing atmospheric pressure and the temperature of baking, of the first quantity of inert gas introduced into the baking step, and the second quantity of inert gas introduced into the baking furnace when the temperature has dropped below 900° C., should be less than the unoccupied volume of the baking furnace. The preferred inert gas for this purpose is helium; hydrogen is not recommended because of the danger of explosion at the elevated temperatures of the baking furnace, and because of the danger of oxidizing the electrodes on removal from the furnace. Even though it is possible to operate a furnace containing hydrogen with minimum danger of explosion, when the hot finished electrodes are removed from the furnace in the presence of hydrogen, combustion and oxidation of the electrodes are likely.

The invention will now be illustrated with several examples.

EXAMPLE 1

Electrodes in the shape of a forged eyebar were made as follows. Graphite powder (Union Carbide "GP–39"), novolac resin powder containing hexamethylene curing agent, and denatured alcohol were blended together in a mixer until the resin was dissolved. About 15 parts of resin per 100 parts of graphite powder were used; sufficient alcohol (about 90 parts per 100 parts of resin plus graphite) was used to form a stirrable slurry of resin solution and graphite. The graphite powder was 98% finer than 200 mesh (74 microns), 2% slightly larger. The resin had a molecular weight of about 650 and contained about 6 to 7 parts of curing agent per 100 parts of resin.

The slurry of graphite powder in resin solution was placed in a tank fitted with a stirring mechanism to keep the graphite in suspension. The suspension was gradually introduced from the tank through an atomizer into a spray drier, through which was passed a stream of hot air to evaporate the alcohol solvent, yielding a resin-coated graphite powder.

A mold having the shape (in reverse) of the eyebar was successively loaded with twenty 245 gram portions of premolded powder, and each portion was compressed 10 minutes. at 190° C. The parts all had a density of 1.51. A measurement of the surface hardness of these parts was made by measuring the indentation made with a conical tungsten carbide point, having an angle of 30° between the axis and the side of the cone, under a weight of 1000 grams. Six characteristic locations were measured for each electrode part, and the average of all 120 readings was 20.2 microns. The electrodes were then placed in an evacuable furnace which was free from oxygenyielding impurities, and was sealed to prevent the entry of atmospheric oxygen. The furnace was evacuated to an absolute pressure of less than 0.1 mm. Hg in 30 minutes, and 10 cubic feet of helium (between one-fourth and one-half the unoccupied volume of the furnace) were introduced into the furnace. An absolute pressure of less than 0.1 mm. Hg was again attained in an additional 30 minutes, and a second 10 cubic feet of helium were introduced. When 0.1 mm. Hg absolute pressure was reacted the third time, the power for heating the furnace was turned on, and the temperature raised at about 50° C./hour until 1300° C. was reached, which temperature was held for 1 hour. During heat-up and baking the vacuum was maintained at less than 0.5 mm. Hg absolute pressure. Power to the furnace and pumping were then discontinued, and the furnace was allowed to cool. Ten cubic feet of helium were introduced at this point to aid cooling, and an additional 10 feet when the temperature reached 900° C. When the temperature dropped to 200° C., the seal on the furnace was broken and the electrodes removed.

The electrodes were then again tested for hardness, and the average of the 120 readings was again 20.2 microns, showing that the average surface hardness was equal to that prior to carbonizing the resin.

The above test was repeated, varying the baking technique to a nitrogen atmospheric baking, with no vacuum applied to the furnace. Preform molding pressures, molding times, and preform weights were also varied somewhat, but are not believed to have affected electrode performance. Densities ranged from 1.461 to 1.726 grams per cubic centimeter. Seven of the eyebar electrodes which were premolded at about 230 kg./cm.$^2$ were found to have a surface hardness represented by an average indentation of 19.7 microns, while 25 electrodes which were premolded at half that pressure had a surface hardness represented by an average indentation of 14.4 microns. After nitrogen-surrounded baking, these groups were found to have hardnesses represented by average indentations of 22.1 and 23.8 microns, respectively, indicating a decrease in surface hardness and apparent surface oxidation.

Tests of an electrode from the vacuum-baked group and an electrode from the group of 7 premolded at the higher pressure were tested for utility in electrical discharge machining, on a Cintrojet 2120 EDM machine. The vacuum-baked electrode was suitable and made a very good cut at up to 90 amps current, while the nitrogen baked electrode developed stuttering (unevenness in cutting) at about 22 amps, and began to arc in a single location. The nitrogen baked electrode was restarted in another attempt, but arced again in a single location at 24 amps.

EXAMPLE 2

Example 1 was repeated with a different type of graphite having an average particle size less than 44 microns (325 mesh), and surface hardnesses represented by average indentations of 4.4 and 3.6 microns before and after vacuum baking were observed; while 4.7 and 5.6 microns before and after nitrogen surrounded baking were observed. This confirms that nitrogen baking leads to softening the surface of the electrode, while vacuum baking either increases or does not affect average hardness.

As with Example 1, a functional test of an electrode from each group was made. Arcing in one location was observed at 12 amps for the nitrogen-baked electrode, but the vacuum baked electrode was operable up to 90 amps, at which point stuttering began. The current was then dropped back to 60 amps, at which the electrode was fully operable.

EXAMPLE 3

Example 1 was again repeated for another shape of electrode (connecting rod cap), except that the comparative nitrogen-baked electrodes were not made to test for increase in hardness during baking, nor was a functional EDM test performed. An average of 4 hardness readings on each of 25 electrodes indicated that the average indentation was 19.4 microns before baking, but 15.8 microns after vacuum baking, again confirming the importance of vacuum baking as contrasted to nitrogen surrounded baking, in increasing surface hardness and preventing surface oxidation.

The above examples should not be interpreted to mean that nitrogen surrounded baking produces electrodes which always fail, only that vacuum-baking decreases the likelihood of failure.

I claim:

1. A process for producing a composite molded carbonaceous electrode, comprising the steps of
    (1) forming a dry powder, each 100 parts of powder comprising from about 60 to 100 parts of at least partially graphitized powder, and from 0 to about 40 parts of ungraphitized petroleum coke powder;
    (2) coating the dry powder with from about 10 to about 35 parts, per 100 parts of dry powder, of a phenol-aldehyde novolac resin coating, whereby to form a coated powder;
    (3) molding a predetermined amount of the coated powder into a resin-bonded composite body at a temperature of from about 100° C. to about 600° C. and a mechanical pressure of from about 20 to about 600 kg./cm.² for a period of from about 30 seconds to about 5 hours;
    (4) placing the resin-bonded composite body in a sealable, evacuable baking furnace which is free from oxygen-yielding impurities;
    (5) sealing the baking furnace to prevent the entry of oxygen;
    (6) evacuating the baking furnace by pumping the gaseous content therefrom, until an absolute pressure of less than about 0.5 mm. Hg is attained;
    (7) flushing the baking furnace at least once during evacuation by introducing a quantity of low molecular weight gas selected from the group consisting of hydrogen, helium, neon, argon, and krypton into the baking furnace while continuing to pump the gaseous content from the baking furnace, and maintaining a subatmospheric pressure within the baking furnace;
    (8) raising the temperature of the baking furnace to at least about 1250° C., maintaining the absolute pressure within the baking furnace at less than about 1.0 mm. Hg during this temperature raising step;
    (9) baking the resin-bonded composite body in the baking furnace at a temperature of at least about 1250° C. for at least about 30 minutes, while maintaining the vacuum at less than about 5.0 mm. Hg whereby to completely cure the resin within the composite body and to carbonize the cured resin, converting said resin to a carbon matrix bonding together the at least partially graphitized carbon and ungraphitized petroleum coke as inclusions and forming a composite molded carbonaceous electrode;
    (10) discontinuing pumping and heating;
    (11) allowing the temperature of the baking furnace to drop to less than about 200° C. prior to breaking the seal on the baking furnace; and
    (12) removing the composite molded carbonaceous electrode.

2. The process of claim 1, wherein during the evacuation step, the baking furnace is evacuated to an absolute pressure of less than about 0.1 mm. Hg.

3. The process of claim 1, comprising at least 2 flushing steps during evacuation.

4. The process of claim 1, wherein the low molecular weight gas is helium.

5. The process of claim 1, wherein the absolute pressure within the baking furnace, prior to each flushing step is less than about 0.1 mm. Hg.

6. The process of claim 1, wherein the ratio of the volume of the low molecular weight gas for each flushing step at the prevailing atmospheric pressure and prevailing temperature to the unoccupied volume of the baking furnace ranges from about 1:4 to about 1:2.

7. The process of claim 1, wherein the absolute pressure in the baking furnace during the temperature raising step is maintained at less than about 0.5 mm. Hg.

8. The process of claim 1, wherein the resin-bonded composite body is baked for at least about 1 hour at a temperature of at least about 1300° C. and an absolute pressure less than about 0.5 mm. Hg.

9. The process of claim 1, wherein a quantity of inert gas is introduced into the baking furnace after discontinuing pumping and heating, said quantity having a volume, at the prevailing atmospheric pressure and the temperature of baking which is less than the unoccupied volume of the baking furnace.

10. The process of claim 9, wherein the ratio of the volume, at the prevailing atmospheric pressure and the temperature of baking of the inert gas introduced into the baking furnace after discontinuing pumping and heating, to the unoccupied volume of the baking furnace, ranges from about 1:4 to about 1:2; and a second quantity of inert gas is introduced into the baking furnace after the temperature of the baking furnace has dropped below about 900° C., the sum of the volumes, at the prevailing atmospheric pressure and at the temperature of baking of the quantity of inert gas introduced into the baking furnace after the baking step, and the second quantity of inert gas introduced into the baking furnace after the temperature of the baking furnace has dropped below 900° C., is less than the unoccupied volume of the baking furnace.

11. The process of claim 10, wherein the inert gas is helium.

12. The process of claim 1, wherein the temperature of the baking furnace is raised to at least about 1250° C. at a rate of temperature increase of not greater than 50° C./hour.

References Cited
UNITED STATES PATENTS

| | | | |
|---|---|---|---|
| 3,346,678 | 10/1967 | Ohlgren | 264—29 |
| 3,255,283 | 6/1966 | Weidman | 264—29 |
| 3,281,261 | 10/1966 | Lynch | 264—29 |
| 3,462,289 | 8/1969 | Rohl | 264—29 |

DONALD J. ARNOLD, Primary Examiner

U.S. Cl. X.R.

264—102, 105